US010316194B2

(12) United States Patent
Jouffret et al.

(10) Patent No.: US 10,316,194 B2
(45) Date of Patent: Jun. 11, 2019

(54) TALC COMPOSITION AND USES THEREOF

(71) Applicant: Imertech SAS, Paris (FR)

(72) Inventors: Frederic Jouffret, Venerque (FR); Jerome Crepin-Leblond, Colomiers (FR); Jean-Sebastien Mas, Luzenac (FR)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 14/769,141

(22) PCT Filed: Feb. 17, 2014

(86) PCT No.: PCT/EP2014/052995
§ 371 (c)(1),
(2) Date: Aug. 20, 2015

(87) PCT Pub. No.: WO2014/128072
PCT Pub. Date: Aug. 28, 2014

(65) Prior Publication Data
US 2015/0376414 A1 Dec. 31, 2015

(30) Foreign Application Priority Data
Feb. 22, 2013 (EP) .................................. 13290069

(51) Int. Cl.
*C08K 3/34* (2006.01)
*C09C 1/28* (2006.01)
*C08K 3/26* (2006.01)
*C08K 3/30* (2006.01)
*C08K 3/36* (2006.01)
*C08K 3/40* (2006.01)
*C08K 9/08* (2006.01)
C08K 9/06 (2006.01)
C08K 3/22 (2006.01)
C09C 3/08 (2006.01)
C09C 3/10 (2006.01)
C09C 3/12 (2006.01)

(52) U.S. Cl.
CPC .................. *C09C 1/28* (2013.01); *C08K 3/26* (2013.01); *C08K 3/30* (2013.01); *C08K 3/34* (2013.01); *C08K 3/346* (2013.01); *C08K 3/36* (2013.01); *C08K 3/40* (2013.01); *C08K 9/08* (2013.01); *C01P 2004/51* (2013.01); *C01P 2004/54* (2013.01); *C01P 2004/61* (2013.01); *C01P 2006/12* (2013.01); *C08K 9/06* (2013.01); *C08K 2003/2217* (2013.01); *C08K 2003/3045* (2013.01); *C08K 2201/016* (2013.01); *C09C 3/08* (2013.01); *C09C 3/10* (2013.01); *C09C 3/12* (2013.01)

(58) Field of Classification Search
CPC ..... C08K 9/06; C08K 3/34; C08K 2003/2217
See application file for complete search history.

(56) References Cited

U.S. PATENT DOCUMENTS

| 2,844,486 A * | 7/1958 | Lamar ....................... C09C 1/28 241/16 |
| 4,931,493 A * | 6/1990 | Weber ....................... C08K 9/08 523/205 |
| 6,348,536 B1 | 2/2002 | Fourty et al. |
| 6,593,400 B1 * | 7/2003 | Drummond .............. C08K 9/06 106/465 |
| 2001/0006990 A1 * | 7/2001 | Jeong ........................ C08K 3/34 524/456 |
| 2006/0264556 A1 * | 11/2006 | Lustiger ............... B62D 29/043 524/451 |
| 2007/0040304 A1 | 2/2007 | Bell et al. |
| 2010/0234513 A1 * | 9/2010 | Milesi ...................... C08K 3/36 524/447 |
| 2012/0123033 A1 * | 5/2012 | Lederer ................... C08K 5/13 524/151 |
| 2015/0344315 A1 * | 12/2015 | Rugheimer ............. C09C 1/028 428/35.2 |

FOREIGN PATENT DOCUMENTS

| CN | 1352866 A | 6/2002 |
| CN | 101679673 A | 3/2010 |
| CN | 102311669 A | 1/2012 |
| EP | 0 355 808 A2 | 2/1990 |
| JP | A-H02-135242 | 11/1988 |
| JP | A-2010-526898 | 8/2010 |
| JP | 2011 213903 A | 10/2011 |
| WO | WO 2008/135529 | 11/2008 |

OTHER PUBLICATIONS

State Intellectual Property Office of China Search Report dated Aug. 17, 2016, in corresponding Chinese Application No. 2014800224091 (2 pages).
International Search Report and Written Opinion dated May 13, 2014, in PCT/EP2014/052995.

* cited by examiner

*Primary Examiner* — Margaret G Moore
(74) *Attorney, Agent, or Firm* — Finnegan, Henderson, Farabow, Garrett & Dunner LLP

(57) ABSTRACT

A surface treated high aspect ratio talc may be surface treated with a surface treatment agent including a polymeric species including one or more ether linkages. Functional compositions including a surface treated high aspect ratio talc may be polymer compositions. A process for preparing a surface treated high aspect ratio talc may include mixing the high aspect ratio talc and surface treatment agent. A process for preparing a polymer composition may include combining a high aspect ratio talc with a polymer in an amount of at least about 30% by weight, based on the total weight of the polymer composition.

20 Claims, No Drawings

TALC COMPOSITION AND USES THEREOF

CLAIM FOR PRIORITY

This application is a U.S. national phase entry under 35 U.S.C. § 371 from PCT International Application No. PCT/EP2014/052995, filed Feb. 17, 2014, which claims the benefit of priority of European Patent Application No. 13290069.7, filed Feb. 22, 2013, the subject matter of both of which is incorporated herein by reference.

TECHNICAL FIELD

The present invention is directed to a surface treated high aspect ratio talc, to functional compositions comprising said surface treated high aspect ratio talc, to processes for preparing said surface treated high aspect ratio talc and functional compositions, to uses of the surface treated high aspect ratio talc as a filler, and to polymer composites and articles formed from the functional compositions.

BACKGROUND

High aspect ratio talcs have been developed to provide stiffness in plastics (and barrier performance for rubber, paper and coatings). Exemplary high aspect ratio talcs are described in U.S. Pat. No. 6,348,536. It is today mainly used in polypropylene based formulations with a talc content ranging from about 5 to 40 wt. %, based on the total weight of the formulation. It has been observed that at relatively high talc loading, typically 30 wt. % or above, some surface defects can appear on molded parts (e.g., automotive body panels). It would be desirable to provide new talcs for use in such formulations such that surface defects are reduced or eradicated.

SUMMARY OF THE INVENTION

According to a first aspect of the present invention, there is provided a surface treated high aspect ratio talc (HART), in which the high aspect ratio talc is surface treated with a surface treatment agent comprising a polymeric species comprising one or more ether linkages.

According to a second aspect of the present invention, there is provided a process for preparing a surface treated HART, the process comprising mixing HART and surface treatment agent as defined in accordance with the first aspect of the present invention in suitable amounts to obtain said surface treated HART.

According to a third aspect of the present invention, there is provided a functional composition comprising the surface treated HART according to first aspect of the present invention or obtainable by the second aspect of the present invention. In certain embodiments, the functional composition is a polymer composition.

According to a fourth aspect of the present invention, there is provided a process for preparing a polymer composition comprising combining surface treated HART according to the first aspect of the present invention with a polymer in amount of at least about 30% by weight, based on the total weight of the polymer composition.

According to a fifth aspect of the present invention, there is provided the use of a surface treated HART according to the first aspect of the present invention as a filler, for example, extender filler or functional filler, in a functional composition.

According to a sixth aspect of the present invention, there is provided a polymer composite or article formed from, for example, extruded or molded from, the polymer composition according to certain embodiments of the third aspect of the present invention.

DETAILED DESCRIPTION OF THE INVENTION

High Aspect Ratio Talc

As used herein, the term "talc" means either the hydrated magnesium silicate mineral, or the mineral chlorite (hydrated magnesium aluminium silicate), or a mixture of the two, optionally associated with other minerals, for example, dolomite and/or magnesite, or furthermore, synthetic talc, also known as talcose.

As used herein, the term "coated" means particles of the talc are surface treated or contacted with a compound which adheres (e.g., physisorbed or bonded) or is otherwise associated with the surface of the talc.

As used herein, the term "high aspect ratio talc" means a talc particulate having a lamellarity index of greater than about 2.8. The lamellarity index' is defined by the following ratio:

$$\frac{d_{mean} - d_{50}}{d_{50}}$$

in which "$d_{mean}$" is the value of the mean particle size ($d_{50}$) obtained by a particle size measurement by wet Malvern laser scattering (standard AFNOR NFX11-666 or ISO 13329-1) and "$d_{50}$" is the value of the median diameter obtained by sedimentation using a sedigraph (standard AFNOR X11-683 or ISO 13317-3), as described below. Reference may be made to the article by G. Baudet and J. P. Rona, Ind. Min. Mines et Carr. Les techn. June, July 1990, pp 55-61, which shows that this index is correlated to the mean ration of the largest dimension of the particle to its smallest dimension. In the following description, the term "high aspect ratio talc" may be used interchangeably with the term "talc particulate having a lamellarity index of greater than about 2.8" or "talc having an aspect ratio of greater than 2.8". In certain embodiments, the talc particulate having a lamellerity index of greater than about 2.8 is further characterized by having a $d_{50}$ between about 0.5 and 5 µm, a $d_{95}$ of less than about 15 µm (or less than about 10 µm), a $d_{98}$ of less than about 20 µm (each determined by sedigraph, as described below), and a specific surface area (BET) of greater than about 10 m$^2$/g.

Exemplary talc particulates having a lamellarity index of greater than about 2.8, and methods for making same, are described in U.S. Pat. No. 6,348,536, the entire contents of which are hereby incorporated by reference.

As used herein, "specific surface area (BET)" means the area of the surface of the particles of the talc particulate with respect to unit mass, determined according to the BET method by the quantity of argon adsorbed on the surface of said particles so to as to form a monomolecular layer completely covering said surface (measurement according to the BET method, AFNOR standard X11-621 and 622 or ISO 9277).

Unless otherwise stated, particle size properties referred to herein for the talc particulate materials are as measured in a well known manner by sedimentation of the particulate material in a fully dispersed condition in an aqueous medium using a Sedigraph 5100 machine as supplied by Micromeritics Instruments Corporation, Norcross, Ga., USA (www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value. The $d_{95}$ value is the value at which 95% by weight of the particles have an esd less than that $d_{95}$ value. The $d_{98}$ value is the value at which 98% by weight of the particles have an esd less than that $d_{98}$ value.

In the Malvern laser light scattering technique referred to above, the size of particles in powders, suspensions and emulsions may be measured using the diffraction of a laser beam, based on an application of Mie theory. Such a machine, for example a Malvern Masterizer S (as supplied by Malvern Instruments) provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

In certain embodiments, the high aspect ratio talc has a lamellarity index of greater than about 3.0, for example, greater than about 3.2, or greater than about 3.4, or greater than about 3.6, or greater than about 3.8, or greater than about 4.0, or greater than about 4.2, or greater than about 4.4. In certain embodiments, the lamellarity index is less than about 5.0, for example, less than about 4.5, or less than about 4.2. Similarly, in certain embodiments, the high aspect ratio may be defined as a talc particulate having a lamellarity index of greater than about 3.0, for example, greater than about 3.2, or greater than about 3.4, or greater than about 3.6, or greater than about 3.8, or greater than about 4.0. In certain embodiments, the talc particulate has a lamellarity index of less than about 5.0, for example, less than about 4.5, or less than about 4.2. Similarly, in certain embodiments, the high aspect ratio talc may be defined as talc having an aspect ratio of greater than about 3.0, for example, greater than about 3.2, or greater than about 3.4, or greater than about 3.6, or greater than about 3.8, or greater than about 4.0. In certain embodiments, the talc has an aspect ratio of less than about 5.0, for example, less than about 4.5, or less than about 4.2.

In certain embodiments, the high aspect ratio talc (or talc particulate having a lamellarity index of greater than about 2.8, or talc having an aspect ratio of greater than 2.8) has a specific surface area (BET) of from about 10 m$^2$/g to about 40 m$^2$/g, for example, from about 10 m$^2$/g to about 30 m$^2$/g, or from about 10 m$^2$/g to about 25 m$^2$/g, or from about 10 m$^2$/g to about 20 m$^2$/g. In certain embodiment, the high aspect ratio talc (or talc particulate having a lamellarity index of greater than about 2.8, or talc having an aspect ratio of greater than 2.8) has a specific surface area (BET) equal to or greater than about 12 m$^2$/g, for example, equal to or greater than about 14 m$^2$/g, or equal to or greater than about 16 m$^2$/g, or equal to or greater than about 18 m$^2$/g, or equal to or greater than about 20 m$^2$/g, or equal to or greater than about 22 m$^2$/g, or equal to or greater than about 22 m$^2$/g, or equal to or greater than about 24 m$^2$/g, or equal to or greater than about 26 m$^2$/g, or equal to or greater than about 28 m$^2$/g. In certain embodiments, the high aspect ratio talc has a specific surface area (BET) of less than about 40 m$^2$/g, for example, less than about 35 m$^2$/g, or less than about 30 m$^2$/g.

In certain embodiments, the high aspect ratio talc (or talc particulate having a lamellarity index of greater than about 2.8, or talc having an aspect ratio of greater than 2.8) has a $d_{50}$ between about 1 and 4 µm, for example, between about 1.5 and 4 µm, or between about 2 and 3.5 µm, or between about 2 and 3 µm. Optionally, the high aspect ratio talc may have a $d_{95}$ of less than about 15 µm and/or a $d_{98}$ of less than about 30 µm, for example, a $d_{95}$ of less than about 14 µm and/or a $d_{98}$ of less than about 28 µm, or a $d_{95}$ of less than about 13 µm and/or a $d_{98}$ of less than about 27 µm, or a $d_{95}$ of less than about 12 µm and/or a $d_{98}$ of less than about 26 µm, or a $d_{95}$ of less than about 11 µm and/or a $d_{98}$ of less than about 25 µm, or a $d_{95}$ of less than about 10 µm and/or a $d_{98}$ of less than about 24 µm.

In certain embodiments, the talc is the hydrated magnesium silicate mineral or the mineral chlorite, or a mixture thereof. Optionally, the talc may further include dolomite or magnesite, or combinations thereof. The amount of dolomite and/or magnesite in the talc may be less than about 10% by weight, based on the total weight of talc, for example, less than about 5% by weight, or less than about 1% by weight, or less than about 0.75% by weight, or 0.5% by weight or less, based on the total weight of talc. In certain embodiments, the talc comprises, consists essentially of, or consists of synthetic talc or talcose.

Based on the weight of talc, the surface treated high aspect ratio talc may comprise from about 50 to about 99.9% by weight talc, for example, from about 60 to about 99.9% by weight talc, or from about 70 to about 99.9% by weight talc, or from about 80 to 99.9% by weight talc or from about 85 to about 99.9% by weight talc, or from about 90 to about 99.9% by weight talc, or from about 92 to about 99.9% by weight talc, or form about 94 to about 99.9% by weight talc, or from about 95 to about 99.8% by weight talc, or from about 96 to about 99.7% by weight talc, or from about 97 to about 99.6% by weight talc, or from about 98 to about 99.5% by weight talc, or at least about 90% by weigh talc, or at least about 92% by weight talc, or at least about 94% by weigh talc, or at least about 95% by weigh talc, or at least about 96% by weight talc, or at least about 97% by weigh talc, or at least about 98% by weight talc, or at least about 98.5% by weight talc, or at least about 99.0% by weight talc, or at least about 99.1% by weight talc, or at least about 99.2% by weight talc, or at least about 99.3% by weight talc, or at least about 99.% by weight talc, or at least about 99.5% by weight talc.

Surface Treatment Agent

In accordance with the first aspect of the present invention, the high aspect ratio talc is surface treated with a surface treatment agent comprising a polymeric species which comprises one more ether linkages.

In certain embodiments, the polymeric species comprising one or more ether linkages is a polyether or a derivative thereof.

In certain embodiments, the surface treatment agent consists essentially of, or consists of, the polymeric species comprising one or more ether linkages, e.g., polyether and/or polyether modified polysiloxane.

In certain embodiments, the polyether is a polyoxyalkylene (POA), for example, polyalkylene glycol (PAG) or polyalkylene oxide (PAO). As used herein, the term 'polyalkylene glycol' means a POA having a number average molecular mass below 20,000 g/mol, and the term 'polyalkylene oxide' means a POA having a number average molecular mass above 20,000 g/mol. In certain embodiments, the surface treatment agent comprises or is a polyalkylene glycol having a number average molecular mass of from about 100 to about 15,000 g/mo, for example, from about 200 to about 10,000 g/mol, or from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to about 8500 g/mol.

In certain embodiments, the polyether is a polyalkylene oxide selected from one or more of paraformaldehyde (polymethylene oxide), polytetramethylene glycol, polytetramehtylene ether glycol, polyethylene oxide, polypropylene oxide, polybutylene oxide, and combinations thereof.

In certain embodiments, the surface treatment agent comprises or is polyethylene glycol. In certain embodiments, the surface treatment comprises or is a mixture of polyethylene glycol and polypropylene glycol (PPG). In certain embodiments, the surface treatment agent is polyethylene glycol having a number average molecular mass of from about 200 to about 10,000 g/mol, for example, from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to abut 8500 g/mol. An exemplary PEG includes the Puriol™ range of polyglycols from BASF, for example, Puriol™ 8005.

In certain embodiments, the polyether comprises or is an aromatic polyether, for example, polyphenyl ether or poly (p-phenylene oxide).

In certain embodiments, the polymeric species comprising one or more ether linkages is a polyether modified polysiloxane. Advantageously, the polyether modified polysiloxane is derived from a linear polysiloxane. In certain embodiments, the polyether modified polysiloxane is derived from poly(dimethylsiloxane), poly(hexamethyldisiloxane), poly(octamethyltrisiloxane), poly(decamethyltetrasilozne), or combinations thereof. The modifying polyether may be any of the polyether species described above. In certain embodiments, the modifying polyether is a polyalkylene glycol, for example, one or more of polymethylene glycol, polyethylene glycol and polybutylene glycol. In certain embodiments, the modifying polyether is polyethylene glycol (PEG), for example, PEG having a molecular weight in the range of from about 200 to about 10,000 g/mol. In certain embodiments, the polyether modified siloxane is a PEG-modified polysiloxane. Exemplary PEG-modified polysioxanes include the Dynasylan™ range from Evonik, for example, Dynasylan™ 4144.

Based on the weight of talc, the surface treated high aspect ratio talc may comprise from about 0.1 to about 10% by weight surface treatment agent, for example, from about 0.1 to about 8% by weight surface treatment agent, or from about 0.1 to about 6% by weight, or from about 0.1 to about 5% by weight, or from about 0.2 to about 5% by weight, or from about 0.1 to about 4% by weight, or from about 0.1 to about 3% by weight, or from about 0.1 to about 2% by weight, or from about 0.1 to about 1.5% by weight, or from about 0.1 to about 1% by weight, or from about 0.1 to about 0.5% by weight, or from about 0.2 to about 0.8% by weight, or from about 0.3 to about 0.7% by weight, or from about 0.4 to about 0.6% by weight surface treatment agent.

Preparation of Surface Treated High Aspect Ratio Talc

The surface treated high aspect ratio talc may be made by mixing high aspect ratio talc and the surface treatment agent in suitable amounts, for example, in suitable amounts to obtain a surface treated high aspect ratio talc comprising from about 0.1 to about 10% by weight surface treatment agent, based on the weight of talc, for example, from about 0.1 to about 1% by weight surface treatment agent. The surface treatment agent may be provided in the form of a solution or dispersion. The solvating/dispersing species may be any liquid medium within which dissolves the surface treatment agent dissolves or disperses. If the surface treatment agent is soluble in water, the surface treatment agent may be provided in the form of an aqueous solution. The water may be de-ionised.

In certain embodiments, the surface treated high aspect ratio talc is prepared by mixing a high aspect ratio talc with an aqueous solution of polyether, for example, PEG and/or PPG. In certain embodiments, the surface treated high aspect talc is prepared by mixing a high aspect ratio talc with an aqueous solution of polyether modified polysiloxane, for example, PEG-modified polysilozane.

The solution or dispersion of surface treating agent may be prepared by mixing and stirring the surface treatment agent in a suitable amount of solvating/dispersing liquid medium. Stirring may be continued for a suitable period of time to dissolve or disperse the surface treatment agent in the liquid medium. The resulting solution or dispersion is then mixed with a suitable amount of high aspect ratio talc. Mixing may be carried out in any suitable mixing apparatus, of example, a high speed mixer comprising a rotating mixing blade capable of operating at speeds of up to about 5000 rpm, or up to about 10,000 rpm. An exemplary mixer is a high speed mixer made by Henchel. Other suitable high speed mixers include a Rotor/stator mixer, a RVO2E intensive mixer (from Maschinenfabrik Gustav Eirich GmbH & Co KG), Ystral™, Ultra Turrax™ or Steele and Cowlishaw high intensity mixer. In certain embodiments, the high aspect ratio talc is set in motion in the mixer before addition of the surface treatment agent, for example, the high aspect ratio talc is mixed for a period of time at a speed of from about 100 to about 1000 rpm, for example, from about 300 to 700 rpm, and then the surface treatment agent is added, e.g., poured to the talc in motion. When the desired amount of surface treatment agent has been added, the mixer may be sealed and then mixing speed may be increased, for example, to at least about 1500 rpm, or at least about 2000 rpm, typically no greater than about 5000 rpm, for a suitable period of time such that at least a portion of, or at least a majority of, or substantially all of, the surface treatment agent adheres (e.g., physisorbed or bonded) to the surface of the particles of the high aspect ratio talc. A person of skill in the art will be able to determine suitable mixing conditions (i.e., amount of talc, amount of surface treatment agent, solvating/dispersing liquid medium, speed of mixing and duration of mixing) to obtain a surface treated high aspect ratio talc according to aspects of the present invention. At the higher speed mixing phase, the high speed mixer may be operated at a period of up to about 60 minutes, for example, up to about 30 minutes, or up to about 20 minutes, or up to about 10 minutes, or up to about 9 minutes, or up to about 7 minutes, or up to about 6 minutes, or up to about 5 minutes.

Alternatively, the surface treated high aspect ratio talc may be prepared by combining the surface treatment agent in a solid state with the talc (in the desired amounts) and heated to a temperature higher than the melting point of the surface treatment agent either by heat generated by high speed shear (e.g., when the mixing of the materials is carried out in a high speed mixer of the type described above) or by external heating means, e.g., heat applied to the mixing chamber of the mixing apparatus.

Functional Composition

The surface treated high aspect ratio talc (HART) of the present invention may be used as a filler in a functional composition. As used herein, the term "functional composition" means a composition of matter which is formulated to meet the needs of a specific application.

In certain embodiments, the surface treated high aspect ratio talc may be used as a functional filler in a functional composition, for example, to modify, enhance or modulate one or more physical, mechanical, thermal or optical properties of the functional composition.

In certain embodiments, the surface treated high aspect ratio talc is used as an extended filler, for example, to supplement or supplant other filler materials, which may be more expensive or more difficult to incorporate into the functional composition.

The functional composition comprising the surface treated high aspect ratio talc may be a polymer composition.

In certain embodiments, the functional composition comprises from about 10 to about 70% by weight of the surface treated high aspect ratio talc, based on the total weight of the functional composition, for example, from about 20 to about 60% by weight, or from about 25 to about 50% by weight, or from about 30 to about 50% by weight, or from about 30 to about 45% by weight, or from about 30 to about 40% by weight, or from about 35 to about 45% by weight of the surface treated high aspect ratio talc. In certain embodiments, the functional composition comprises at least about 10% by weigh of the surface treated high aspect ratio talc, based on the total weight of the functional composition, for example, at least about 20% by weight, or at least about 25% by weight, or at least about 30% by weight, or at least about 35% by weight, or at least about 37% by weight, or at least about 40% by weight surface treated high aspect ratio talc.

The functional composition may comprise filler other than the surface treated high aspect ratio talc including, but not limited to, an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, mica, perlite, feldspars, nepheline syenite, wollastonite, diatomaceous earth, barite, glass, and natural or synthetic silica or silicates. In certain embodiments, the functional composition may comprise a talc other than the high aspect ratio talc described herein, i.e., a talc having a lamellarity index of less than 2.8, for example, less than 2.7, or less than 2.6, or less than 2.5, or less than 2.4, or less than 2.3, or less than 2.2, or less than 2.1, or less than 2.0.

The filler compounds other than the surface treated high aspect ratio talc may be included during preparation of the functional composition, or alternatively, during preparation of the surface treated high aspect ratio talc, e.g., the high aspect ratio talc and other filler, such as talc having a lamellarity index of less than 2.8, may be mixed and blended and then combined with the surface treatment agent. In such embodiments, the other filler compound(s) may be surface treated with the surface treatment agent.

In certain embodiments, the amount of other filler compound(s) is present in amount less than about 10% by weight, based on the total weight of the functional composition, for example, less than about 5% by weight, or less than about 1% by weight, or less than about 0.5% by weight, or less than about 0.4% by weight, or less than about 0.3% by weight, or less than about 0.2% by weight, or less than about 0.1% by weight. In certain embodiments, the amount of other filler compound is present in an amount of at least about 0.01% by weight, based on the total weight of the functional composition.

In certain embodiments, the functional composition is a polymer composition. The polymer composition may comprise any natural or synthetic polymer or mixture thereof. The polymer may, for example, be thermoplastic or thermoset. The term "polymer" used herein includes homopolymers and/or copolymers, as well as crosslinked and/or entangled polymers.

The term "precursor" as may be applied to the polymer component will be readily understood by one of ordinary skill in the art. For example, suitable precursors may include one or more of: monomers, cross-linking agents, curing systems comprising cross-linking agents and promoters, or any combination thereof. Where, according to the present invention, the high aspect ratio talc material is mixed with precursors of the polymer, the polymer composition will subsequently be formed by curing and/or polymerising the precursor components to form the desired polymer.

Polymers, including homopolymers and/or copolymers, comprised in the polymer composition of the present invention may be prepared from one or more of the following monomers: acrylic acid, methacrylic acid, methyl methacrylate, and alkyl acrylates having 1-18 carbon atoms in the alkyl group, styrene, substituted styrenes, divinyl benzene, diallyl phthalate, butadiene, vinyl acetate, acrylonitrile, methacrylonitrile, maleic anhydride, esters of maleic acid or fumaric acid, tetrahydrophthalic acid or anhydride, itaconic acid or anhydride, and esters of itaconic acid, with or without a cross-linking dimer, trimer, or tetramer, crotonic acid, neopentyl glycol, propylene glycol, butanediols, ethylene glycol, diethylene glycol, dipropylene glycol, glycerol, cyclohexanedimethanol, 1,6 hexanediol, trimethyolpropane, pentaerythritol, phthalic anhydride, isophthalic acid, terephthalic acid, hexahydrophthalic anyhydride, adipic acid or succinic acids, azelaic acid and dimer fatty acids, toluene diisocyanate and diphenyl methane diisocyanate.

The polymer may be selected from one or more of polymethylmethacrylate (PMMA), polyacetal, polycarbonate, polyvinyls, polyacrylonitrile, polybutadiene, polystyrene, polyacrylate, polyethylene, polypropylene, epoxy polymers, unsaturated polyesters, polyurethanes, polycyclopentadienes and copolymers thereof. Suitable polymers also include liquid rubbers, such as silicones.

The polymers which may be used in accordance with the invention are advantageously thermoplastic polymers. Thermoplastic polymers are those which soften under the action of heat and harden again to their original characteristics on cooling, that is, the heating-cooling cycle is fully reversible. By conventional definition, thermoplastics are straight and branched linear chain organic polymers with a molecular bond. Examples of polymers which may be used in accordance with the invention include, but are not limited to polyethylene, for example, linear low density polyethylene (LLDPE) and medium density grades thereof, high density polyethylene (HDPE), low density polyethylene (LDPE), polypropylene (PP), polyethylene terephthalate (PET), vinyl/polyvinyl cholride (PVC), polystyrene, and mixtures thereof.

In certain embodiments, the polymer is a polyalkylene polymer, for example, polyethylene, polypropylene, polybutylene, or a copolymer of two or more of ethylene, propylene and butylenes monomers, for example, an ethylene-propylene copolymer. In certain embodiments, the polymer is a mixture of two or more of propylene, polyethylene and ethylene-propylene copolymer, for example a mixture of propylene and polyethylene.

In certain embodiments, the polymer comprises, consists essentially of, or consists of polypropylene or polyethylene or a mixture of polypropylene and polyethylene.

Preparation of Functional Composition

The functional composition can be prepared by mixing of the components thereof intimately together. The said surface treated high aspect ratio talc may then be suitably blended, e.g., dry blended, with the mixture of components and any desired additional components, before processing to form an a final functional composition or article.

The polymer composition of the present invention may be prepared by combining surface treated high aspect ratio talc, as described herein, with a polymer in amount of at least about 10% by weight, based on the total weight of the polymer composition, for example, in an amount of at least about 20% by weight, or at least about 30% by weight, or at least about 35% by weight, or at least about 40% by weight, or at least about 45% by weight, or at least about 50% by weight, or at least about 60% by weight, based on the total weight of the polymer composition. In certain embodiment, the amount of surface treated high aspect ratio talc is from about 10 to about 70% by weight, based on the total weight of the polymer composition, for example, from about 20 to about 60% by weight, or from about 25 to about 50% by weight, or from about 30 to about 50% by weight, or from about 30 to about 45% by weight, or from about 30 to about 40% by weight, or from about 35 to about 45% by weight, based on the total weight of the polymer composition. In certain embodiments, the polymer composition comprises at least about 30% by weight polymer, based on the total weight of the polymer composition, for example, from about 30 to about 90% by weight polymer, or from about 40 to about 80% by weight polymer, from about 50 to 75% by weight polymer, from about 50 to about 70% by weight polymer, or from about 55 to about 70% by weight polymer, or from about 60 to about 70% by weight polymer, or from about 55 to 65% by weight polymer, based on the total weight of the polymer composition.

Preparation of the polymer compositions of the present invention can be accomplished by any suitable mixing method known in the art, as will be readily apparent to one of ordinary skill in the art.

Such methods include dry blending of the individual components or precursors thereof and subsequent processing in a conventional manner. Certain of the ingredients can, if desired, be pre-mixed before addition to the compounding mixture.

In the case of thermoplastic polymer compositions, such processing may comprise melt mixing, either directly in an extruder for making an article from the composition, or pre-mixing in a separate mixing apparatus. Dry blends of the individual components can alternatively be directly injection moulded without pre-melt mixing.

The polymer composition can be prepared by mixing of the components thereof intimately together. The said surface treated high aspect ratio talc may then be suitably dry blended with the polymer and any desired additional components, before processing as described above.

Other filler compounds, such as those described above and including, for example, talc having a lamellarity index of less than 2.8, may be added and blended in at the mixing stage.

For the preparation of cross-linked or cured polymer compositions, the blend of uncured components or their precursors, and, if desired, the surface treated high aspect ratio talc and any desired non-talc component(s), will be contacted under suitable conditions of heat, pressure and/or light with an effective amount of any suitable cross-linking agent or curing system, according to the nature and amount of the polymer used, in order to cross-link and/or cure the polymer.

For the preparation of polymer compositions where the surface treated high aspect ratio talc and any desired other component(s) are present in situ at the time of polymerisation, the blend of monomer(s) and any desired other polymer precursors, surface treated high aspect ratio talc and any other component(s) will be contacted under suitable conditions of heat, pressure and/or light, according to the nature and amount of the monomer(s) used, in order to polymerise the monomer(s) with the surface treated high aspect ratio talc and any other component(s) in situ.

In certain embodiments, the surface treated high aspect ratio talc is dispersed with agitation into a mixture comprising polymer (for example, polypropylene) and optionally a curing agent. The mixture may further comprise a mould release agent.

The resulting dispersion can be degassed to remove entrained air. The resulting dispersion can then be poured into a suitable mould and cured. Suitable curing temperatures range from 20-200° C., for example 20-120° C., or, for example, 60-90° C.

The starting polymer mixture can further comprise a pre-polymer (for example, propylene monomer). The pre-polymer may or may not correspond to the starting polymer.

The viscosity of the starting polymer or polymer/monomer solution, amount of curing agent, release agent and surface treated high aspect ratio talc can be varied according to the requirements of the final cured product. Generally, the greater the amount of surface treated high aspect ratio talc added, the higher the viscosity of the dispersion. Dispersant agents can be added to reduce the viscosity of the dispersion. Alternatively, the amount of polymer in the starting solution can be reduced.

Suitable curing agents will be readily apparent to one of ordinary skill in the art, and include organic peroxides, hydroperoxides and azo compounds. Examples of peroxide and hydroperoxide curing agents include dimethyl dibutylperoxyhexane, benzyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide and t-butyl peroctoate.

The compounded compositions may further comprise additional components, such as slip aids (for example Erucamide), process aids (for example Polybatch® AMF-705), mould release agents and antioxidants.

Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate calcium oleate, zinc palmitate. Typically, slip and process aids, and mould release agents are added in an amount less than about 5 wt. % based on the weight of the masterbatch. Polymer articles, including those described above, may then be extruded, compression moulded or injected moulded using conventional techniques known in the art, as will be readily apparent to one of ordinary skill in the art. Thus, as described below, the present invention is also directed to articles formed from the polymer compositions of the present invention.

In certain embodiments, the polymer composition comprises a colorant which, if present, will be added during compound of the polymer composition. The colorant may be added in the form of a masterbatch. Suitable colours are many and various.

In certain embodiments, the process includes the step of mixing or blending a surface treated high aspect ratio talc in an amount of greater than about 30% by weight with a pre-formed polymer. For example, the surface treated high aspect ratio talc may be added to a twin-screw extruder to which unfilled polymer is being fed and made molten. The surface treated high aspect ratio talc is fed into the extruder through a hopper, for example, via gravimetric feeding, and uniformly blends with the polymer. The mixture emerges from the extruder and may be cooled. Then, for example, the mixture can be further compression moulded or injection moulded into useful shapes.

The methods described above may include compounding and extrusion. Compounding may be carried out using a twin screw compounder, for example, a Clextral BC 21 double screw extruder 9 (having an appropriate length/diameter, for example, between 30 and 50, for example, between about 30 and 40), or a Leistritz ZSE 18 double screw extruder (having an appropriate length/diameter ratio, for example, between about 30 and 50, for example, between about 40 and 50) or Baker Perkins 25 mm twin screw compounder. The polymer, surface treated high aspect ratio talc and optional additional components may be premixed and fed from a single hopper. The resulting melt may be cooled, for example, in a water bath, and then pelletized. Test pieces, e.g., charpy bars or tensile dumbbells, may be injection moulded or cast or blown into film.

The screw temperature may be between about 100° C. and about 300° C., for example, between about 150° C. and about 280° C., for example, between about 180° C. and about 250° C., or between about 200 and 230° C.

Screw speed may be between about 100 and 1200 rpm, for example, between about 100 and 1000 rpm, for example, between about 200 and 800 rpm, for example, between about 250 and 650 rpm, for example, between about 200 and 400 rpm, or between about 500 and 700 rpm. In certain embodiments, screw speed is about 300 rpm. In other embodiments, screw speed is about 600 rpm.

Suitable injection molding apparatus includes, for example, a Billion 50T Proxima press. The polymer composition may be dried prior to molding. Drying may be carried out at any suitable temperature, for example, about 60° C., for a suitable period of time, for example, between about 1 hours and 20 hours, for example, between about 2 and 18 hours, or between about 1 and 3 hours, or between about 4 and 8 hours, or between about 12 and 18 hours. The temperature during drying may be kept constant or varied. In certain embodiments, the temperature during drying is between about 70 and 120° C., for example, between about 80 and 100° C., for example, about 90° C.

Molding is generally conducted at a temperature at which the polymer composition is flowable. For example, the molding temperature may be between about 100 and 300° C., for example, between about 200 and 300° C., or between about 240 and about 280° C. Following molding the molded piece will be allowed to cool and set.

Other suitable processing techniques include gas-assisted injection molding, calendaring, vacuum forming, thermoforming, blow-molding, drawing, spinning, film forming, laminating or any combination thereof. Any suitable apparatus may be used, as will be apparent to one of ordinary skill in the art.

The polymer composition can be processed to form, or to be incorporated in, articles of commerce in any suitable way, as described herein. The articles which may be formed from the functional composition, for example, polymer composition are many and various. Examples include automotive body parts and panels, for example, a bonnet (hood), wing piece, wing-mirror casing, door (front and/or rear), tail gate and bumper (front and/or rear).

In certain embodiments, the polymer compositions and/or polymer composites and/or of the present invention may be characterised in terms of a physical or mechanical property or properties. For example, it has unexpectedly been found that the surface treated high aspect ratio talc according to embodiments of the present invention may be incorporated into polymers at relatively high loadings (e.g., at a loading level of greater than about 30% by weight, or at least about 35% by weight, or at least about 40% by weight) without the occurrence of surface defects, or at least a lower occurrence of surface defects, that have otherwise been found in polymer compositions comprising a corresponding amount of a comparable high aspect ratio talc which has not been surface treated in accordance with the methods described herein. As such, polymer compositions and/or polymer composites and/or articles formed from the polymer composition according to embodiments of the invention may be characterised by the substantial absence of surface defects. The occurrence of surface defects is thought to be a consequence of the processing of a polymer composite form a polymer composition using techniques such as injection molding or extrusion. The extent of surface defects, such as injection marks, may be determined in accordance with the method described in the Examples below.

In certain embodiments, polymer compositions and/or polymer composites and/articles formed therefrom may be characterized in terms of Charpy impact properties, also referred to as impact strength, for example, unnotched Charpy impact strength or notched Charpy impact strength. These properties may be determined in accordance with the methods described in the Examples below. In certain embodiments, the polymer composition and/or polymer composite and/or article formed therefrom, comprising an amount of surface treated high aspect ratio talc (e.g., at least about 30% by weight, or at least about 35% by weight, or at least about 40% by weight) may have an unnotched Charpy impact strength (at −20° C., and/or at −10° C., and/or at 0° C.) and/or a notched Charpy impact strength (at 23° C.) which is comparable to, or improved relative to, a polymer composition and/or polymer composite and/or article formed therefrom, comprising a comparable amount of high aspect ratio talc that has not been treated surface treated in accordance with the methods described herein.

In certain embodiments, polymer compositions and/or polymer composites and/articles formed therefrom may be characterized in terms of a Heat Distortion Temperature (HDT). This property may be determined in accordance with the methods described in the Examples below. In certain embodiment, the polymer composition and/or polymer composite and/or article formed therefrom, comprising an amount of surface treated high aspect ratio talc (e.g., at least about 30% by weight, or at least about 35% by weight, or at least about 40% by weight) may have a HDT which is comparable to a polymer composition and/or polymer composite and/or article formed therefrom, comprising a comparable amount of high aspect ratio talc that has not been treated surface treated in accordance with the methods described herein.

In certain embodiments, polymer compositions and/or polymer composites and/articles formed therefrom may be characterized in terms of Long Term Thermal Stability (LTTS). This property may be determined in accordance with the methods described in the Examples below. In certain embodiment, the polymer composition and/or polymer composite and/or article formed therefrom, comprising an amount of surface treated high aspect ratio talc (e.g., at least about 30% by weight, or at least about 35% by weight, or at least about 40% by weight) may have a LTTS which is comparable to, or improved relative to, a polymer composition and/or polymer composite and/or article formed therefrom, comprising a comparable amount of high aspect ratio talc that has not been treated surface treated in accordance with the methods described herein. In certain embodiments, the polymer compositions and/or polymer composites and/articles formed therefrom may be characterized in terms of Long Term Thermal Stability (LTTS). This property may be determined in accordance with the methods described in the Examples below. In certain embodiment, the polymer composition and/or polymer composite and/or article formed therefrom, comprising an amount of surface treated high aspect ratio talc (e.g., at least about 30% by weight, or at least about 35% by weight, or at least about 40% by weight) has a LTTS of at least about 20 hours, for example, at least about 25 hours, or at least about 26 hours, or at least about 27 hours, or at least about 28 hours. In certain embodiments, the polymer composition and/or polymer composite and/or article formed therefrom, comprising an amount of surface treated high aspect ratio talc (e.g., at least about 30% by weight, or at least about 35% by weight, or at least about 40% by weight) has a LTTS which is at least about 50% greater (in terms of the amount of hours) than a polymer composition and/or polymer composite and/or article formed therefrom, comprising a comparable amount of high aspect ratio talc that has not been treated surface treated in accordance with the methods described herein, for example, a LTTS which is at least about 75% greater, or at least about % greater, or at least about 110% greater, or at least about 120% greater.

For the avoidance of doubt, the present application is directed to the subject-matter described in the following numbered paragraphs:

1. A surface treated high aspect ratio talc (HART), wherein high aspect ratio talc is surface treated with a surface treatment agent comprising a polymeric species comprising one or more ether linkages.
2. The surface treated HART according to numbered paragraph 1, wherein the HART has a lamellarity index of at least about 3.0.
3. The surface treated HART according to numbered paragraph 1 or 2, wherein the HART has a specific surface area (BET) of from about 10 m$^2$/g to about 40 m$^2$/g.
4. The surface treated HART according to any preceding numbered paragraph, wherein the HART has a d$_{50}$ of from about 1 to about 4 µm.
5. The surface treated HART according to any preceding numbered paragraph, wherein the HART has a d$_{90}$ of less than about 15 µm.
6. The surface treated HART according to any preceding numbered paragraph, wherein the polymeric species comprising one or more ether linkages is a polyether or derivative thereof.
7. The surface treated HART according to numbered paragraph 6, wherein the polyether is a polyoxyalkylene (POA), for example, a polyalkylene glycol (PAG).
8. The surface treated HART according to any one of numbered paragraphs 1-6, wherein the polyether derivative is a polyether modifed polysiloxane, for example, a polyalkylene glycol modified polysiloxane.
9. The surface treated HART according to any preceding numbered paragraph, wherein the surface treated high aspect ratio talc comprises from about 0.1 to about 10% by weight surface treatment agent, based on the weight of talc, for example, from about 0.2 to about 5 wt. % surface treatment agent.
10. A process for preparing a surface treated HART, comprising mixing HART and surface treatment agent as defined in any one of claims 1-9 in suitable amounts to obtain a surface treated HART according to any one of claims 1-9.
11. A functional composition comprising the surface treated HART according to any one of numbered paragraphs 1-9 or obtainable by the process of claim 10.
12. The functional composition of numbered paragraph 11, wherein the functional composition is a polymer composition.
13. A polymer composition according to numbered paragraph 12, wherein the polymer is thermoplastic or thermoset.
14. The polymer composition according to numbered paragraph 13, wherein the polymer is selected from polypropylene, polyethylene, a propylene-ethylene copolymer, or combinations thereof.
15. The polymer composition according to numbered paragraph 14, wherein the polymer comprises, consists essentially of, or consists of polypropylene.
16. The functional composition according to any one of numbered paragraphs 11 to 15, comprising at least about 30% by weight surface treated HART, based on the total weight of the functional composition, for example, at least about 35% by weight surface treated HART, for example, at least about 40% by weight of the surface treated HART.
17. The function composition according to any one of numbered paragraphs 11 to 16, further comprising filler other than the surface treated high aspect ratio talc and selected from an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, mica, perlite, feldspars, nepheline syenite, wollastonite, diatomaceous earth, barite, glass, natural or synthetic silica or silicates, and talc having a lamellarity index of less than 2.8, and combinations thereof.
18. A process for preparing a polymer composition comprising combining surface treated HART according to any one of numbered paragraphs 1-9 or obtainable by the process of claim 10 with a polymer in amount of at least about 30% by weight, based on the total weight of the polymer composition, for example, in an amount of at least about 35% by weight surface treated HART, for example, in an amount of at least about 40% by weight of the surface treated HART.
19. The process according to numbered paragraph 18, further comprising extruding or injection molding the polymer composition to form a polymer composite or article.
20. Use of a surface treated HART according to any one of numbered paragraphs 1-9 or obtainable by the process of numbered paragraph 10 as a filler, for example, extender filler or functional filler, in a functional composition.

21. Use according to numbered paragraph 20, wherein the functional composition is a polymer composition or a polymer composite formed therefrom.

22. Use according to numbered paragraph 20 for reducing surface defects, for example, injection marks, in a polymer composite or an article formed from the polymer composition.

23. Use according to numbered paragraph 20 for improving impact strength of a polymer composite or article formed from the polymer composition.

24. Use according to numbered paragraph 20 for improving the Long Term Thermal Stability (LTTS) of a polymer composite or article formed from the polymer composition.

25. Use according to any one of numbered paragraphs 20-24, wherein the polymer composition comprises at least about 35% by weight, for example, at least about 40% by weight of the surface treated HART, based on the total weight of the polymer composition.

26. A polymer composite or article formed from, for example, extruded or molded from, the polymer composition of any one of numbered paragraphs 12 to 17.

27. An article according to numbered paragraph 26, in the form of an automotive body part, for example, panel.

28. A polymer composition, or polymer composite or article formed therefrom, according to any one of numbered paragraphs 12-17 and 26-27 having:
  (i) a first unnotched Charpy impact strength (at −20° C., and/or at −10° C., and/or at 0° C.) which is greater than a second unnotched Charpy impact strength ((at −20° C., and/or at −10° C., and/or at 0° C.) of a polymer composition, or polymer composite or article formed therefrom, comprising the same amount of high aspect ratio talc that has not been treated with a surface treatment agent; and/or
  (ii) a first LTTS which is greater than a second LTTS of a polymer composition, or polymer composite or article formed therefrom, comprising the same amount of high aspect ratio talc that has not been treated with a surface treatment agent.

29. A polymer composition, or polymer composite or article formed therefrom, according to numbered paragraph 28, wherein the polymer composition comprises at least about 35% by weight, for example, at least about 40% by weight of the surface treated HART, based on the total weight of the polymer composition.

The invention will now be illustrated, by reference to the following non-limiting examples.

EXAMPLES

Unless otherwise specified, the following test methods were used to characterise the materials prepared in the Examples:

Aspect Evaluation

Carried out on 60 mm by 60 mm by 2 mm plaques. The plaques are stored for a minimum of 24 hours in a 23° C./50% HR room. The plaques aspect is quoted while looking for the presence (or not) of white streaks, parallel to the flow direction. This type of defect is typical of non-dried talc reinforced PP compounds. Generally, the defect (if present) is more visible when viewing the plaque parallel to its surface.

Flexural Modulus

Measured on 80 mm by 10 mm by 4 mm bars according to ISO 178.

Charpy Impact Strength

Measured on 80 mm by 10 mm by 4 mm bars according to ISO 178. Unnotched samples at −20° C., −10° C. and 0° C.; notched samples at 23° C.

Heat Distortion Temperature (HDT)

Measured on 80 mm by 10 mm by 4 mm bars according to ISO 75A.

Long Term Thermal Stability (LTTS)

Measure on 80 mm by 10 mm by 4 mm bars based on ISO 4577-1983. The test is performed with 5 bars of each formulation at a fixed place in an oven in which the temperature is fixed at 150° C. The samples are removed when 30% of the surface (area) has been oxidized. The degradation time is accounted in days.

Example 1—Preparation of Surface Treated High Aspect Ratio Talc

High Aspect Ratio Talc Characteristics:
  PSD as measured by sedigraph (ISO 13317-3): $d_{50}$=2.1 µm; $d_{95}$=11.7 µm
  PSD as measured by laser (ISO 13329-1): $d_{50}$=11.5 µm; $d_{95}$=37.1 µm
  Specific surface area (BET): 18 m$^2$/g
  Mineral composition: talc/chlorite/dolomite 81.5/17/0.5 as measured by thermogravimetric analysis (TGA)
  Weight loss at 1050° C. (by TGA): 6.7%

Surface Treatment Agents:
i) polyethylene glycol (PEG) having a molecular weight of about 8000 g/mol
ii) PEG-modified polysiloxane (3-methoxy{poly(ethyleneoxy)}]propyltrimethoxysilane)

Each surface treatment agent was prepared as a solution.

5 g of the PEG was mixed with 10 g of de-ionised water in a 50 ml beaker. The mixture was stirred with a magnetic bar at room temperature for 10 minutes to dissolve the PEG in the water.

5 g of the PEG-modified polysiloxane was added to 20 g of de-ionised water in 150 ml beaker. The mixture was stirred with a magnetic bar at room temperature for 46 minutes to dissolve the PEG-modified polysiloxane in the water.

1 kg of the high aspect ratio talc was placed in a high speed mixer (Henchel). The blade speed was set at 550 rpm. The solution of surface treatment agent was poured on the talc in motion. Following addition of the surface treatment agent the mixer was closed completely and the blade speed increased to 2400 rpm for six minutes.

The surface treated talc was then discharged into bags which left open for 3 days to evaporate water.

The obtained surface treated talcs comprised 0.5 wt. % surface treatment agent, based on the weight of talc.

Example 2—Preparation of Polymer Composites

Materials:
  Polypropylene (PP) copolymer (EXXONMobil™ PP7043)
  Stabiliser package comprising: 1 part sterically hindered phenol antioxidant, 1 part trisarylphosphite processing stabilizer, 1 part calcium stearate, and optionally 3 parts of a talc having a lamellarity index of less than 2.8 (this talc component is used for the purpose of diluting the stabilizers and to optimize dosing levels)
  Black Masterbatch
  PEG surface treated high aspect talc prepared in Example 1

Untreated high aspect ratio talc described in Example 1
Polymer compositions were prepared according to the following recipes:

Recipe 1
59.7 wt. % of a mix of PP copolymer and 1.5 wt. % black masterbatch
0.3 wt. % of stabilizer package (without talc component)
40% PEG surface treated high aspect ratio talc Recipe 2
59.7 wt. % of a mix of PP copolymer and 1.5 wt. % black masterbatch
0.3 wt. % of stabilizer package (without talc component)
40% untreated high aspect ratio talc Recipe 1b
59.7 wt. % of a mix of PP copolymer and 1.5 wt. % black masterbatch
0.3 wt. % of stabilizer package (with talc component)
40% PEG surface treated high aspect ratio talc Recipe 2b
59.7 wt. % of a mix of PP copolymer and 1.5 wt. % black masterbatch
0.3 wt. % of stabilizer package (with talc component)
40% untreated high aspect ratio talc Recipe 3
69.4 wt. % PP
0.6 wt. % of stabilizer package (including 3 parts of talc component)
30 wt. % PEG surface treated high aspect ratio talc prepared in Example 1

Recipe 4
69.4 wt. % PP
0.6 wt. % of stabilizer package (including 3 parts of talc component)
30 wt. % untreated high aspect ratio talc described in Example 1.

Example 2a

Recipes 1 and 2 were extruded using a Clextral BC 21 double screw extruder, having length/diameter ratio of 36. The PP, colorant and stabilizer package were introduced at the beginning of extruder screw in the main hopper. The talc was introduced in a second hopper via gravimetric feeding, at a zone where the PP was molten.

The screw temperature was set constant at 205° C. and the screw speed was set at 250 rpm. The total output of the polymer composite was set at 7.5 kg/h.

Example 2b

Recipes 3 and 4 were separately extruded using a Leistritz ZSE 18 double screw extruder, having length/diameter ratio of 44. The PP, colorant and stabilizer package was introduced at the beginning of extruder screw in the main hopper. The talc was introduced via a side feeder, at a zone where the PP was molten.

The screw temperature was set constant at 220° C. The total output of the polymer composited was set at 7.5 kg/h.

Two screw speeds were tested: 300 and 600 rpm.

Mechanical performance of the composites comprising 30% by weight treated and untreated talc (i.e., Recipes 3 and 4) was evaluated. Results are summarized in Table 1 below.

TABLE 1

|  |  | PP | No. 4 (untreated talc) | | No. 3 (surface treated talc) | |
| --- | --- | --- | --- | --- | --- | --- |
|  |  |  | Talc loading | | | |
|  |  | — | 30 wt. % | | 30 wt. % | |
|  | Screw speed |  | 600 | 300 | 600 | 300 |
| Ash content at 400° C. |  | 0.3 | 30.2 | 30.5 | 29.6 | 30.1 |
| Flexural modulus (MPa) | 0-5 N measured | 1157 | 4216 | 4120 | 4097 | 4065 |
|  | σ | 13 | 32 | 20 | 29 | 26 |
|  | 0-5 adjusted @ 20° C. | 1157 | 4196 | 4071 | 4137 | 4055 |
|  | σ | 15 | 30 | 20 | 30 | 25 |
| Impact strength (kJ/m²) | Charpy unnotched @ −20° C. | — | 13.8 | 14.4 | 15.1 | 14.7 |
|  | σ | — | 0.8 | 0.8 | 0.8 | 0.9 |
|  | Charpy unnotched @ −10° C. | — | 14.2 | 14.5 | 15.4 | 15.1 |
|  | σ | — | 0.9 | 0.9 | 0.8 | 0.9 |
|  | Charpy unnotched @ 0° C. | — | 14.5 | 16.7 | 15.7 | 17.2 |
|  | σ | — | 0.9 | 0.6 | 0.9 | 1.0 |
| HDT | @ 1820 kPa (° C.) | 51.3 | 74.8 | 78.2 | 71.2 | 72.4 |
|  | σ | 0.2 | 0.4 | 0.4 | 0.3 | 0.9 |
| LTTS | Duration (days) | >31 | 9 | 13 | 26 | 29 |
|  | σ |  | 0.5 | 3.3 | 3.3 | 2.1 |

Example 2c

Example 2b was repeated, but using a 40 wt. % talc loading according to Recipes 1 b and 2b The screw speed was 600 rpm.

Example 2d

Recipes 1 b, 2b, 3 and 4 were aspect evaluated for presence of injection marks, in accordance with the procedure described above. 20 plates of each recipe were dried in an oven at 90° C. for 2 hours before evaluation, 20 plates of each recipe were dried in an oven at 90° C. for 6 hours before evaluation, and 20 plates of each recipe were dried in an oven at 90° C. for 16 hours before evaluation.

Each plate was 60 mmm by 60 mm by 2 mm (thick). Five purges of the injection press screw were made before each recipe injection to prevent contamination between recipes. Between the injection press and the oven, plates were transferred quickly in a closed plastic basket.

Each plate was visually inspected for the presence of injection marks, and assigned a rank of 0, 1, 2, 3, 4 or 5. A rank of '0' indicates the total absence of injection marks. A rank of '5' indicates severe injection marking. A 'rank' of 0 is most desirable.

At 30 wt. % talc loading, i.e., Recipes 3 and 4, and drying at 2 hours, 6 hours and 16 hours, no injection marks were seen on the plates, i.e., each plate was assigned a rank of '0'.

Results at 40 wt. % talc loading, i.e., Recipe 1 b (surface treated HART) and Recipe 2b (untreated HART), i.e., 40 wt. % loading, are summarised in Table 2.

TABLE 2

|  | Rank | | | | | |
| --- | --- | --- | --- | --- | --- | --- |
|  | 0 | 1 | 2 | 3 | 4 | 5 |
| 2 hours drying | | | | | | |
| Recipe 2b (no of plates) | | | | | 5 | 15 |
| Recipe 1b (no of plates) | 11 | 8 | 1 | | | |
| 6 hours drying | | | | | | |
| Recipe 2b (no of plates) | | | | 16 | 3 | 1 |
| Recipe 1b (no of plates) | 20 | | | | | |
| 16 hours drying | | | | | | |
| Recipe 2b (no of plates) | | | | 7 | 12 | 1 |
| Recipe 1b (no of plates) | 20 | | | | | |

At 40 wt. % loading, and drying at 2 hours, 6 hours and 16 hours, plates made from Recipe 2b (untreated HART) exhibited injection marks. However, no injection marks were seen on plates made from Recipe 1b (surface treated HART) after drying at 6 hours and 16 hours, and at 2 hours drying the presence of injection was significantly reduced.

The invention claimed is:

1. A molded article comprising:
a polymer composition comprising surface treated high aspect ratio talc (HART) for reinforcing the polymer composition and reducing surface defects in the molded article, wherein the polymer composition comprises 35% to 45% by weight of the surface treated HART, based on the total weight of the polymer composition;
wherein the surface treated HART comprises from about 0.1% to about 10% by weight surface treatment agent and from about 0.1% to about 10% by weight dolomite and/or magnesite, based on the weight of talc; and
wherein the surface treatment agent consists of polymeric species comprising polyether and/or polyether modified polysiloxane.

2. The molded article according to claim 1, wherein the polymer is selected from polypropylene, polyethylene, a propylene-ethylene copolymer, or combinations thereof.

3. The molded article according to claim 1, wherein the polymer composition further comprises filler other than the surface treated HART and selected from an alkaline earth metal carbonate or sulphate, a hydrous kandite clay, an anhydrous kandite clay, mica, perlite, feldspars, nepheline syenite, wollastonite, diatomaceous earth, barite, glass, natural or synthetic silica or silicates, and talc having a lamellarity index of less than 2.8, and combinations thereof.

4. A process for reducing surface defects in a molded article comprising:
providing a polymer composition comprising a polymer; and
combining 35% to 45% by weight of a surface treated high aspect ratio talc (HART) with the polymer, based on the total weight of the polymer composition, to reinforce the polymer composition and reduce surface defects in the molded article;
wherein the surface treated HART comprises from about 0.1% to about 10% by weight surface treatment agent and from about 0.1% to about 10% by weight dolomite and/or magnesite, based on the weight of the talc; and
wherein the surface treatment agent consists of polymeric species comprising polyether and/or polyether modified polysiloxane.

5. A method for increasing the amount of talc in a functional composition to reduce surface defects in a molded article formed using the functional composition, the method comprising:
providing a functional composition; and
incorporating 35% to 45% by weight of a surface treated high aspect ratio talc (HART) into the functional composition, based on the total weight of the functional composition,
wherein the surface treated HART comprises from about 0.1% to about 10% by weight surface treatment agent and from about 0.1% to about 10% by weight dolomite and/or magnesite, based on the weight of talc; and
wherein the surface treatment agent consists of polymeric species comprising polyether and/or polyether modified polysiloxane.

6. The molded article of claim 1, wherein the molded article is formed via extrusion or molding.

7. The molded article of claim 1, wherein the polymer composition has:
(i) a first unnotched Charpy impact strength (at −20° C., and/or at −10° C., and/or at 0° C.) which is greater than a second unnotched Charpy impact strength (at −20° C., and/or at −10° C., and/or at 0° C.) of a polymer composition comprising the same amount of high aspect ratio talc that has not been treated with a surface treatment agent; and/or
(ii) a first long term thermal stability (LTTS) which is greater than a second LTTS of a polymer composition comprising the same amount of high aspect ratio talc that has not been treated with a surface treatment agent.

8. The molded article according to claim 1, wherein the polymeric species comprises one or more ether linkages.

9. The molded article according to claim 1, wherein the HART has a lamellarity index of at least about 3.0.

10. The molded article according to claim 1, wherein the HART has a $d_{50}$ of from about 1 to about 4 μm.

11. The molded article according to claim 8, wherein the polymeric species comprising one or more ether linkages is a polyether or derivative thereof.

12. The molded article according to claim 1, wherein the surface treated HART comprises from about 0.1 to about 8% by weight surface treatment agent, based on the weight of talc.

13. The molded article according to claim 1, wherein the surface treated HART comprises from about 0.1 to about 3% by weight surface treatment agent, based on the weight of talc.

14. The molded article according to claim 1, wherein the surface treated HART comprises from about 0.1 to about 2% by weight surface treatment agent, based on the weight of talc.

15. The molded article according to claim 1, wherein the polymer composition comprises 37% to 45% by weight of the surface treated HART, based on the total weight of the polymer composition.

16. The process according to claim 4, comprising combining 37% to 45% by weight of the surface treated HART, based on the total weight of the polymer composition.

17. The method according to claim 5, comprising incorporating 37% to 45% by weight of the surface treated HART, based on the total weight of the polymer composition.

18. The molded article according to claim 1, wherein the surface treatment agent comprises the polyether; and
    wherein the polyether is polyalkylene glycol or polyalkylene oxide.

19. The molded article according to claim 1, wherein the surface treatment agent comprises the polyether modified siloxane; and
    wherein the polyether modified siloxane is PEG-modified polysiloxane.

20. The molded article according to claim 1, wherein the surface treated HART is a synthetic talc.

\* \* \* \* \*